No. 862,124. PATENTED AUG. 6, 1907.
W. T. ALLAN.
REVERSIBLE EYEGLASSES.
APPLICATION FILED JAN. 28, 1907.
2 SHEETS—SHEET 1.
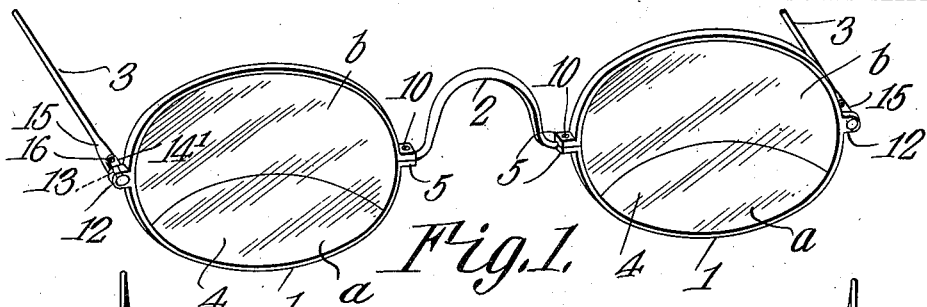
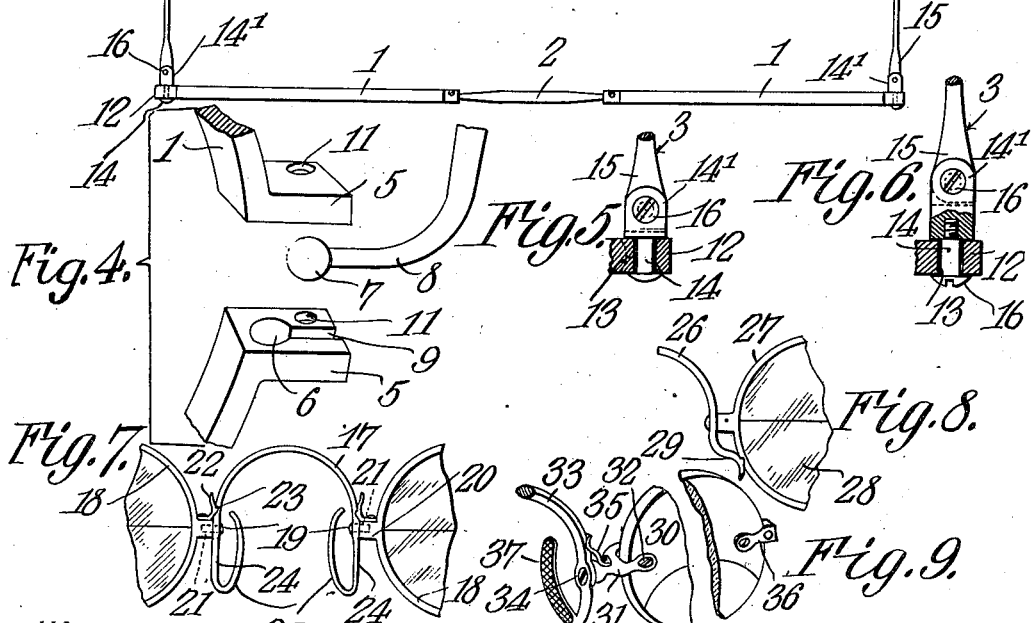
WITNESSES:
C. H. Stewart
C. Bradway
INVENTOR
William T. Allan,
By C. A. Snow & Co.
ATTORNEYS No. 862,124. PATENTED AUG. 6, 1907.
W. T. ALLAN.
REVERSIBLE EYEGLASSES.
APPLICATION FILED JAN. 28, 1907.
2 SHEETS—SHEET 2.
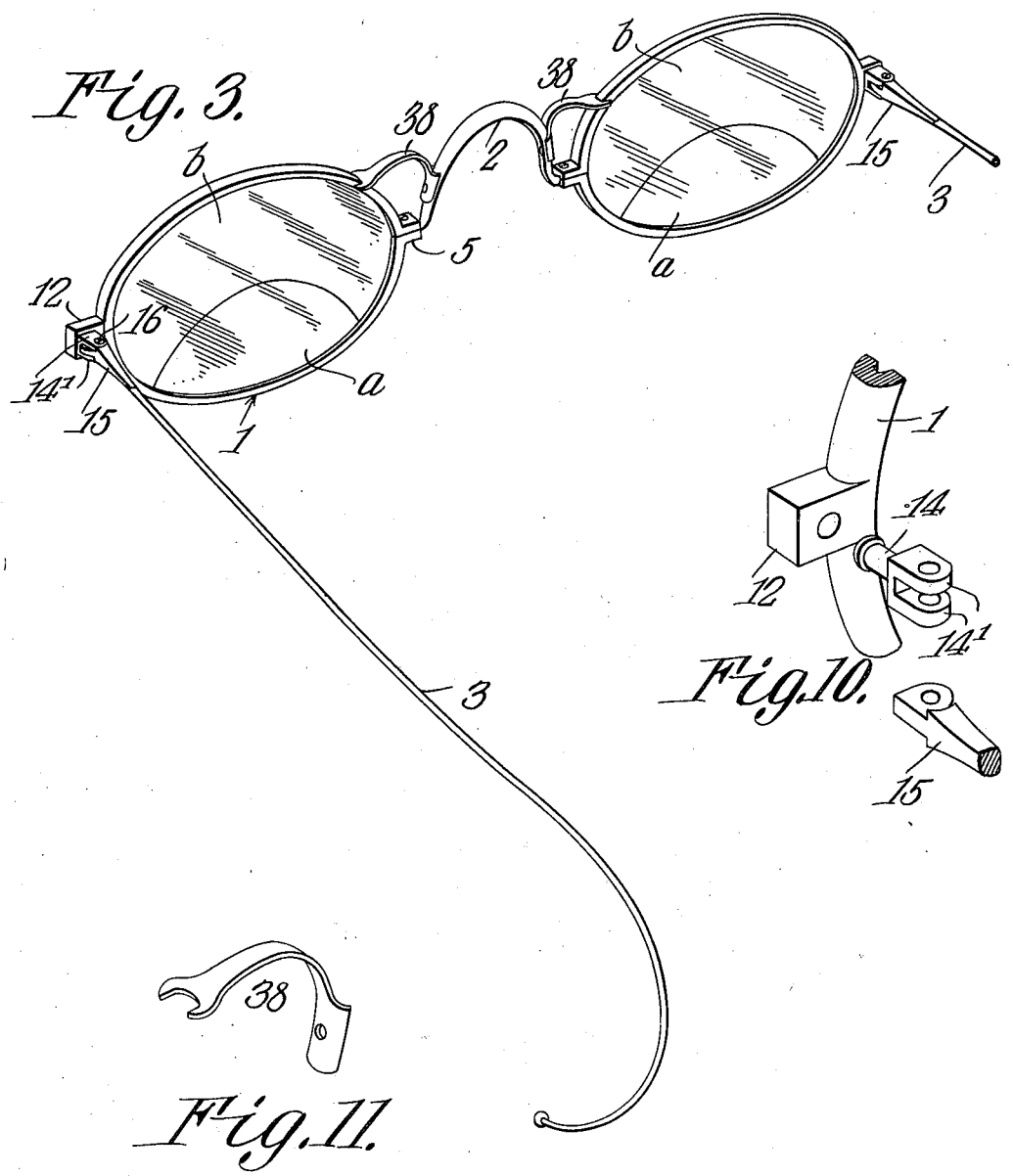
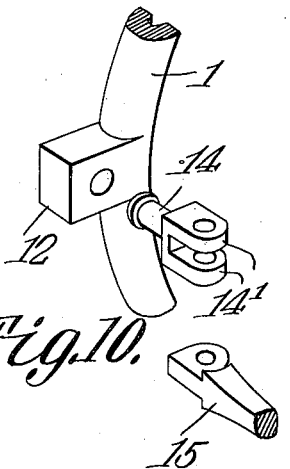
WITNESSES:
E. O. Stewart
C. Bradway.
William T. Allan,
INVENTOR.
By C. A. Snow & Co.
ATTORNEYS

UNITED STATES PATENT OFFICE.

WILLIAM TEMPLE ALLAN, OF JACKSONVILLE, ALABAMA.

REVERSIBLE EYEGLASSES.

No. 862,124.    Specification of Letters Patent.    Patented Aug. 6, 1907.

Application filed January 28, 1907. Serial No. 354,477.

*To all whom it may concern:*

Be it known that I, WILLIAM TEMPLE ALLAN, a citizen of the United States, residing at Jacksonville, in the county of Calhoun and State of Alabama, have invented new and useful Reversible Eyeglasses, of which the following is a specification.

This invention relates to bi-focal eyeglasses or spectacles of that type in which the lenses are so mounted with respect to the bridge piece and temples or ear bows that they can be turned for the purpose of bringing the desired sections of the lenses in the most convenient position for reading or distant seeing.

The invention has for one of its objects to improve and simplify the construction and operation of devices of this character so as to be comparatively easy and inexpensive to manufacture, and conveniently and readily adjusted.

A further object of the invention is the provision of a novel form of pivotal connection between the bridge piece and rims or other support for the lenses of spectacles or eyeglasses.

Another object is to pivotally connect the ear bows to the rims of the lenses, so that the bows can be turned to bring them in proper relation to the bridge-piece when the latter has been adjusted to shift the lenses to the desired position before the eyes of the user.

A still further object is the provision of means for positively locking the bridge-piece to the lenses, or rims for the lenses, so that the lenses are prevented from swinging back and forth with respect to the bridge-piece.

With these objects in view, and others, as will appear as the nature of the invention is better understood, the same comprises the various novel features of construction and arrangement of parts, which will be more fully described hereinafter and set forth with particularity in the claims appended hereto.

In the accompanying drawing, which illustrates certain of the embodiments of the invention, Figure 1 is a perspective view of a pair of bi-focal spectacles showing the temple or ear bows partly broken away. Fig. 2 is a plan view of the spectacles. Fig. 3 is a perspective view of a modified form of spectacles. Fig. 4 is a perspective view of the hinge connection between one end of the bridge-piece and adjacent rim of the spectacles, the parts being shown in disassembled relation. Fig. 5 is a detail view of the hinged and pivoted end of one of the bows riveted to its respective lens supporting rim. Fig. 6 is a modified form of pivotal connection between the ear bows and the rims of the spectacles. Fig. 7 is a fragmentary front view of a pair of eyeglasses having the lenses pivotally attached to the bridge-piece. Fig. 8 is a fragmentary detail view of a modified form of means for holding the lenses in fixed position with respect to the bridge-piece. Fig. 9 is a fragmentary perspective view of means for pivotally connecting the bridge-piece to lenses of the rimless type. Fig. 10 is a perspective view of the hinge and pivot joint between each ear bow and rim. Fig. 11 is a perspective view of one of the locking springs shown in Fig. 3.

Corresponding parts in the several figures are indicated throughout by similar characters of reference.

Referring to the drawing, and more particularly to Figs. 1 to 6, inclusive, 1 designates the rims of the spectacles, 2 the bridge-piece, and 3 the temples or ear bows. The rims 1 support the bi-focal lenses 4 in the usual manner, and each rim is split and bent laterally into lugs 5 at the points adjacent the bridge-piece 2. These lugs are provided with semi-spherical sockets 6 on their opposed faces for receiving the spherical enlargements 7 on the ends of the bridge-piece, as will be understood by reference to Fig. 4. The bridge-piece 2 is bent outwardly at its ends to form the ball carrying arms 8, and these arms are received in recesses 9 on the opposed faces of the lugs 5. These lugs may be clamped together in any suitable manner, as, for instance, by screws 10, Fig. 1, that screw into the apertures 11 of the lugs, Fig. 4. By means of these screws, the lugs can be clamped to the spherical enlargements 7 of the bridge-piece, the frictional engagement being such that the bridge-piece does not turn too freely.

Each rim 1 at a point diametrically opposite the socketed lugs 5 is provided with a laterally extending ear or projection 12 having an aperture 13 extending at right angles to the plane of the rim, as shown in Figs. 1 and 2. In these apertured projections 12 are pivots 14 on which the ear bows 3 turn. According to the preferred construction, each pivot 14 is upset or riveted in its apertured projection, as shown in Fig. 5, so as to freely turn, and, if desired, the pivot may be threaded into the aperture of the projection 12 and slightly upset so as to prevent the pivot from coming out. Each ear bow 3 is connected to its respective pivot 14 by a hinge somewhat like the kind ordinarily used in spectacles for permitting the ear bows to be folded inward against the frame so that the spectacles can be placed in a pocket-case. The heads of the rivets 14 are bifurcated, to provide studs or lugs 14' between which the apertured ends 15 of the ear bows are held by the pintle screws 16. Instead of making the head integral with the pivot 14, as shown in Figs. 1, 3, 5 and 10, it may be made separate and the parts screwed together, as shown in Fig. 6.

From the foregoing description, it will be seen that the bridge-piece 2 and bows 3 can be adjusted so that either section of the lenses 4 will be uppermost and in line with the eyes. When it is desired to adjust the glasses, the bridge-piece 2 is turned downwardly from the position shown in Fig. 1. The bridge-piece swings around the arms 8 as an axis and is turned through half a revolution. The ear bows 3 are then each turned half a turn so as to be in a position opposite from that shown in Fig. 2. The spectacles can then be adjusted to the head and the sections $a$ of the lenses will be uppermost and the sections $b$ lowermost to suit the requirement of the user. To adjust the parts in this manner, it is necessary for the user to take the spectacles off the head and, after the bridge-piece and ear bows are turned, the spectacles are replaced.

In order to positively lock the bridge-piece 2 in fixed relation to the lenses, the bridge-piece is provided with oppositely extending grips 38 made of spring metal and each having a notched extremity for engaging the rim of the adjacent lens, as shown in Fig. 3. The spring grips are riveted, or otherwise suitably secured, to the bridge-piece.
In the modification shown in Fig. 7, the bridge-piece 17 is pivoted to the rims 18 by rivets or screws 19 that extend through the apertures in the bridge-piece. The rims are provided with lugs 20 having tapped openings 21 for receiving the screws 19. In order to prevent the bridge-piece 17 from freely turning, locking devices are employed. Each locking device comprises a spring 22 secured to the projection 20 of each rim 18 and provided with lugs 23 that engage the bridge-piece 17. By bending the springs 22 backwardly, the projections 23 are disengaged from the bridge-piece 17, and the latter can be turned about the screws 19 as centers. The bridge-piece has its extremities 24 extending beyond the screws 19 so that the springs 22 will interlock therewith. This construction may be used for spectacles by employing ear bows, as shown in Figs. 1 and 2, or it may be used for nose glasses by providing the extensions 24 of the bridge-piece with nose grips 25.

Fig. 8 shows another modification of means for holding the bridge-piece 26 in fixed relation to the lenses. The bridge-piece is pivoted to the rim 27 of the lens 28 in the same manner described in connection with Fig. 7. Instead of employing separate springs 22, the bridge-piece has a resilient extension 29 that grips the rim 27 in either of the two positions of adjustment of the bridge-piece. By springing the extensions 29 outwardly away from the rims of the lenses, the bridge-piece can be turned a half revolution whereupon the spring extensions will grip the rims of the lenses and hold the parts in adjusted position.

The various forms of glasses hereinbefore described are confined to constructions in which rims are employed for the lenses. It is obvious, however, that rimless spectacles and nose glasses can be constructed according to the principles of the present invention. One form of rimless eyeglasses is shown in Fig. 9. The lens 30 is bored in the usual manner, and the stud or member 31 secured to the lens by the screw 32 according to the usual practice. The nose-piece 23 is pivoted by means of a screw 34 to the member 31. By this means, the bridge-piece can be adjusted so as to throw the sections of the lenses into the desired position with respect to the eyes of the user. A spring catch or locking device 35 may be employed, if desired.
In the case of spectacles, the lens 30 is provided at a point diametrically opposite from the member or stud 31 with a second stud 36 for receiving the ear bow, which latter is pivoted to the said stud according to either of the methods shown in Figs. 5 and 6. The bridge-piece 33 may, if desired, be provided with nose grips, one of which is indicated at 37. Of course these nose grips are essential for nose glasses, whereas in the case of spectacles they may be used, or dispensed with, according to the preference of the user.

From the foregoing description, taken in connection with the accompanying drawings, the advantages of the construction and of the method of operation will be readily apparent to those skilled in the art to which the invention appertains.

With a pair of spectacles or eyeglasses constructed in the manner set forth, the bridge-piece and ear bows can be readily adjusted so that the sections of the lenses desired to be used are brought immediately within the line of vision, thus eliminating the necessity of looking over the reading portions of the lenses when using the glasses in walking.

The invention obviates the necessity of carrying two pairs of glasses, and it also obviates the injury to the eyes incident to the ordinary bi-focal lenses by the constant shifting of the line of vision between the reading and distance seeing lenses, even if the reading lenses are invisible, the same differences of the focii in the lenses remain. This causes the retina of the eye to constantly and instantaneously accommodate itself to a change of focus which is tiresome to the eye, blurring to the vision and a strain on the nervous system. Furthermore, the present invention does away with the necessity of looking over the reading lenses in walking. This looking over the lenses to see in walking renders the vision uncertain, causes one to hold the head down in an unnatural position which is injurious, and tends to produce stooping and rounding of the shoulders, and flattening of the chest.

What is claimed is:—

1. The combination with a bridge, of lens members pivoted to turn relatively thereto, and means for positioning the members relatively to the bridge.

2. The combination with a bridge, of lens members pivoted to turn relatively thereto, and devices arranged to hold the lens members in operative positions relatively to the bridge.

3. The combination with a bridge member, of lens members pivoted to turn relatively thereto, and spring arms each having one end secured to one of the members and having means at its opposite end to coöperate with the other member to hold the lens members in given angular positions.

4. The combination with a bridge member, of lens members pivoted to turn relatively thereto, and spring arms each having one end secured to one of the members and having its opposite end provided with a notch to coöperate with the other member to hold the lens members in given angular positions.

5. The combination with a pair of bi-focal lens members, of a bridge piece connected for free rotation with the members, ears connected with the lens members, each having an aperture extending at right angles to the major axes of the lens members, temples, and pivots extending through the ears for securing the temples thereto.

6. The combination with a pair of bi-focal lenses, of rims in which the lenses are fixed, a bridge-piece pivotally connected with the rims, ears on the rims at points opposite to the pivotal connections of the bridge piece, temples pivoted to the ears to turn on axes at right angles to the plane of the lenses, and self-acting means for holding the bridge piece in adjusted positions.

7. The combination with a pair of bi-focal lens members, of a bridge-piece, pivotal connections between the bridge piece and the lens members, apertured ears connected with the members, pivots in the ears disposed with their axes at right angles to the plane of the lenses, temples, hinged connections between the temples and the pivots, and self-acting locking means coacting with the bridge piece.

8. The combination with lens members, of a bridge pivoted to turn relative thereto, and self-acting means for holding the bridge in adjusted positions.

In testimony that I claim the foregoing as my own, I have hereto affixed my signature in the presence of two witnesses.

WILLIAM TEMPLE ALLAN.

Witnesses:
 WOODSON W. WEAVER,
 H. H. MONTGOMERY.